United States Patent [19]

Metcalfe

[11] 4,026,564
[45] May 31, 1977

[54] ROTARY SHAFT FACE SEAL

[75] Inventor: Raymond Metcalfe, Chalk River, Canada

[73] Assignee: Atomic Energy of Canada Limited, Ottawa, Canada

[22] Filed: Aug. 20, 1976

[21] Appl. No.: 716,357

[30] Foreign Application Priority Data

Dec. 23, 1975 Canada .............................. 242399

[52] U.S. Cl. .............................. 277/96.1; 277/133
[51] Int. Cl.² .......................................... F16J 15/34
[58] Field of Search ............... 277/81, 91, 96, 96.1, 277/133

[56] References Cited

UNITED STATES PATENTS

| | | | |
|---|---|---|---|
| 2,768,011 | 10/1956 | Mosher | 277/91 |
| 3,410,566 | 11/1968 | Wiese | 277/81 |
| 3,751,045 | 8/1973 | Lindenboom | 277/96.1 |

FOREIGN PATENTS OR APPLICATIONS 2,222,082  11/1973  Germany ........................ 277/96.1

Primary Examiner—Robert I. Smith
Attorney, Agent, or Firm—Francis W. Lemon

[57] ABSTRACT

A rotary shaft face seal in which a rotor on the shaft has an annular seal face which is coaxial with the axis of rotation of the shaft while a stator is eccentrically mounted, relative to the shaft axis of rotation, on an eccentric tubular extension of a partition. The stator is slidable on the tubular extension and has an annular-shaped seal face which is also eccentric to the shaft axis of rotation. Compression springs urge the stator to push the annular-shaped seal face against the seal face of the rotor while pressurized fluid is forced by these seal faces. As the rotor rotates the eccentric, annular-shaped seal face of the stator progressively uncovers portions of the seal face, on the rotor, which were previously covered thereby allowing these portions to cool and thereby promoting lubrication of the relatively sliding seal faces.

5 Claims, 1 Drawing Figure

U.S. Patent   May 31, 1977   4,026,564
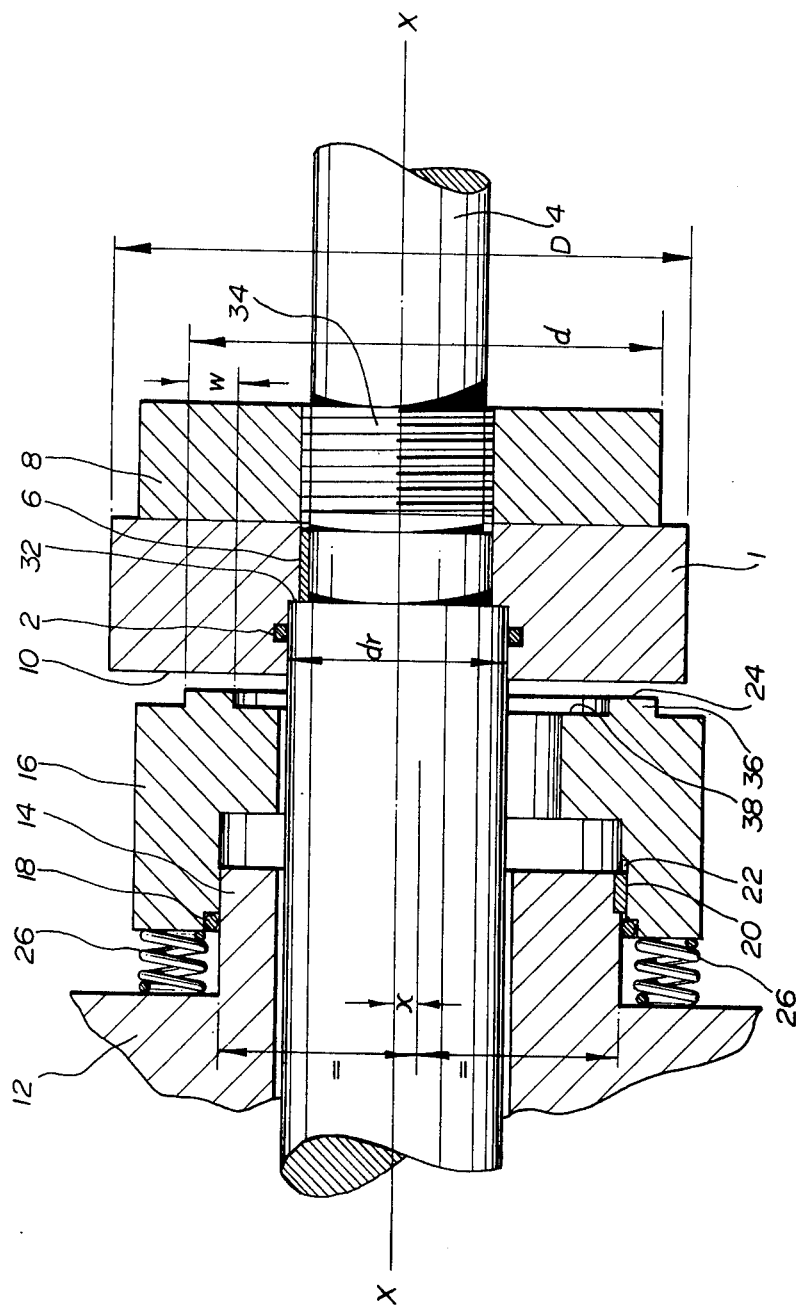

ROTARY SHAFT FACE SEAL

This invention relates to rotary shaft face seals.

Rotary shaft face seals are known wherein a pressurized fluid is injected between opposing, annular, sliding face sealing areas of an annular rotor, sealed to and mounted for rotation with the rotary shaft, and an annular stator sealed to and secured against rotation to a partition, while the annular stator is resiliently urged against the annular rotor to urge the annular sliding faces together. One problem with such face seals is ensuring that they are well cooled and lubricated and yet not so sensitive to pressure that in the larger sizes of seals the deflections at high fluid pressure of the opposing, annular, sliding face sealing areas cannot be controlled so that fluid leakage and friction between these sealing areas cannot be controlled. Conventional circular, concentric face seals rely on cooling by conduction through the seal components rather than direct cooling of the face. This limits the effectiveness of the cooling and thereby sets application limits on the size, fluid pressure and sliding speed at the faces of the seal.

It has already been proposed to provide an annular sliding face sealing area on either the rotor or the stator, the annular face being eccentric with the axis of rotation of the rotor so that intermittent exposure of the annular sealing area opposing the eccentric, annular sliding face sealing area brings that sealing area into contact with a cooling fluid, which is pressurized on one side of the seal but unpressurized on the other, during each revolution of the rotor. It has also been proposed to provide an elliptical sliding face sealing area on either the rotor or the stator for the same purpose. In these seals the rotor and the stator are mounted coaxially and they both suffer from the disadvantage that their use is limited to moderate fluid pressures because excessive fluid pressures induce desirable deflections between the sliding face sealing areas. The excessive deflection is induced by the non-axisymmetric design and is most pronounced when one of the face seal members is of a low elastic modulus material such as carbon.

It is an object of the present invention to provide a rotary shaft face seal wherein fluid cooling and lubrication of the face seal is provided without excessive fluid pressures causing undesirable deflections between the sliding face sealing areas through non-axisymmetric design of the seal.

According to the present invention there is provided a rotary shaft face seal, comprising:

a. rotor sealed on the rotary shaft and secured thereto for rotation therewith and against longitudinal movement along the rotary shaft, the rotor having an annular-shaped seal face on one side, b. a partition through which the rotary shaft extends for relative rotation therewith, the partition having a tubular extension which is radially eccentric with the axis of rotation of the rotary shaft and has the rotary shaft extending therethrough, c. a stator on the rotary shaft and sealed on the tubular extension of the partition, the stator being secured against rotation to the tubular extension and slidable relative therein in the direction of the rotary shaft, the stator having an annular-shaped seal face of smaller outside diameter than that of the seal face of the rotor, the annular-shaped seal face of the stator opposing the seal face of the rotor and being substantially coaxial with the tubular extension, d. resilient means resiliently urging the annular-shaped seal face of the stator into sealing contact with the seal face of the rotor to retard the escape of pressurized fluid therebetween, and wherein e. the outside diameter 'D' of the annular-shaped seal face of the rotor is not less than:

$d + 2x$, where $d$ is the outside diameter of the annular-shaped seal face of the stator, and $x$ is the radial eccentricity of the tubular extension. In the accompanying drawing which illustrates, by way of example, an embodiment of the present invention there is shown diagrammatically a sectional side view of portions of a rotary shaft face seal. Referring now to the drawing, the rotary shaft face seal comprises:

a. a rotor 1 sealed by an o-ring 2 on the rotary shaft 4 and secured thereto by a key 6 for rotation therewith and against longitudinal movement along the rotary shaft by a screw threaded nut 8, the rotor 1 having an annular-shaped seal face 10 on one side, b. a partition 12 through which the rotary shaft 4 extends for relative rotation therewith, the partition 12 having a tubular extension 14 which is radially eccentric with the side XX of rotation of the rotary shaft 4 and has the rotary shaft 4 extending therethrough, c. a stator 16 on the rotary shaft 4 and sealed on the tubular extension 14 of the partition 12 by an O-ring 18, the stator 16 being secured against rotation to the tubular extension 14, by a key 20, and slidable relative thereto in the longitudinal direction of the rotary shaft 4, by the extra long keyway 22 in the stator 16, the stator 16 having an annular-shaped seal face 24 of smaller outside diameter 'd' than the outside diameter 'D' of the seal face 10 of the rotor 1, the annular-shaped seal face 24 of the stator 16 opposing the seal face 10 of the rotor 1 and coaxial with the tubular extension 14, d. resilient means, in the form of compression springs 26 resiliently urging the annular-shaped seal face 24 of the stator 16 into sealing contact with the seal face 10 of the rotor 1 to retard the escape of pressurized fluid therebetween, and wherein, e. the outside diameter 'D' of the annular-shaped seal face 10 of the rotor 1 is not less than:

$d + 2x$, where $d$ is the outside diameter of the annular-shaped seal face 24 of the stator 16, and $x$ is radial eccentricity of the tubular extension 14.

Ideally the radial eccentricity $x$ of the tubular extension 14 and the stator 16 and the annular-shaped seal face 24 of stator 16 is equal to $w/2$, where w is the width of the annular-shaped seal face 24 of stator 16, because then each portion of the seal face 10 becomes uncovered during one revolution of the rotor 1.

The radial eccentricity $x$ may be greater than $w/2$ because then each portion of the seal face 10 still becomes uncovered during one revolution of the rotor 1.

The radial eccentricity $x$ may be less than $w/2$ but then only some portion of the seal face 10 becomes uncovered during one revolution of the rotor 1.

Preferably the stator 16 is loosely secured on the tubular extension 14 in order that the stator 16 can tilt to accommodate shaft wobble or misalignments due to manufacturing tolerances.

The geometrically axisymmetric, but non-axisymmetrically loaded, rotor 1 is preferably made inherently rigid from a material having a modulus of elasticity of large magnitude, while the material from which the geometrically axisymmetric and axisymmetrically loaded stator 16 is made can have a modulus of elasticity of small magnitude and the annular-shaped face seal 24 can have low rigidity without giving rise to any non-axisymmetric deformation.

The rotor 1 is secured against a riser 32 on the rotary shaft 4 and is locked securely to the shaft 4 by a key 6 and by the screw threaded nut 8 which is screw threaded on to a threaded portion 34 of the rotary shaft 4 so that it clamps the rotor against the riser 32. The screw threaded nut 8 supports the rotor 1 no matter where pressure is applied thereto by the annular-shaped seal face 24 of the rotor 16 and by pressure forces of the sealed fluid which may be sealed to retard escape thereof radially outwardly or inwardly between the seal faces 24 and 10 depending on which side is pressurized.

Preferably the annular-shaped seal face 24 of the stator 16 is in the form of an annular-band-like projection 36 on an annular-shaped end face 38 of the stator 16.

In operation the rotary shaft 4, during rotation, rotates the rotor 1 while some of the pressurized fluid being sealed may leak between the opposing stator and rotor seal faces, 24 and 10 respectively, providing lubrication at the interface. The pressurized fluid is unable to escape past the 'O'-ring seals 2 and 18.

As the rotor rotates the area of the seal face 30 covered by the annular-shaped seal face 24 is intermittently uncovered for cooling thereby allowing the seal to be used at higher fluid pressures and in larger sizes than known types of rotary shaft face seals.

Even though the annular-shaped sealing face 24 of the stator 16 is eccentric there is no eccentric loading on the stator 16 which will cause non-axisymmetric distortion of the stator 16.

In different embodiments of the present invention the pressurized fluid is passed radially inwardly or outwardly between the annular-shaped seal face 24 and the seal face 30, depending on which side of the partition 12 the pressure is higher and therefore in which direction the seal is required to act.

Typical dimensions of an example of the rotary shaft face seal as shown in FIG. 1 are:

a. the rotary shaft diameter 'dr' is 4.3/4 inches, b. the rotor 1 is 1 inch thick and has an outside diameter 'D' which is the outside diameter of the rotor seal face, of 7 3/4 inches, c. the eccentricity 'x' is ¼ inch, d. the outside diameter of the tubular extension is 6.3 inches for a well balanced seal with higher pressure at the outside of the seal faces, or is 6.7 inches for a well balanced seal with higher pressure at the inside of the seal faces, e. the stator 16 has an outside diameter of 8 inches, an inside of 5½ inches and is 1½ inches long, f. the annular-shaped seal face of the stator has an outside diameter 'd' of 7 inches and an inside diameter of 6 inches giving a seal face width 'w' of ½ inch.

I claim:

1. A rotary shaft face seal, comprising:

a. a rotor sealed on the rotary shaft and secured thereto for rotation therewith and against longitudinal movement along the rotary shaft, the rotor having an annular-shaped seal face on one side, b. a partition through which the rotary shaft extends for relative rotation therewith, the partition having an extension which is radially eccentric with the axis of rotation of the rotary shaft and has the rotary shaft extending therethrough, c. a stator on the rotary shaft and sealed on the tubular extension of the partition, the stator being secured against rotation to the tubular extension and slidable relative thereto in the direction of the rotary shaft, the stator having an annular-shaped seal face of smaller outside diameter than that of the seal face of the rotor, the annular-shaped seal face of the stator opposing the seal face of the rotor and being substantially coaxial with the tubular extension, d. resilient means resiliently urging the annular-shaped seal face of the stator into sealing contact with the seal face of the rotor to retard the escape of pressurized fluid therebetween, and wherein e. the outside diameter 'D' of the annular-shaped seal face of the rotor is not less than:

$d + 2x$, where $d$ is the outside diameter of the annular-shaped seal face of the stator, and $x$ is the radial eccentricity of the tubular extension.

2. A rotary shaft face seal as claimed in pg,10 claim 1, wherein the radial eccentricity 'x' of the tubular extension and the stator and the annular-shaped seal face of the stator is equal to $w/2$, is the width of the annular-shaped seal face of the stator.

3. A rotary shaft seal according to claim 1, wherein the stator is loosely secured to the tubular extension in order that the stator can tilt to accommodate unbalanced forces due to rotation of the rotor or to non-axisymmetric pressurized fluid balancing.

4. A rotary shaft face seal according to claim 1, wherein the rotor is secured on a step on the rotary shaft and is locked securely to the shaft by a key and by a screw threaded nut which is screwed on to a threaded portion of the rotary shaft so that it clamps the rotor against the riser, and the screw threaded nut supports the rotor no matter where the pressure is applied thereto by the annular-shaped seal face of the rotor and by pressure forces of the sealed fluid.

5. A rotary shaft face seal according to claim 1, wherein the annular-shaped seal face of the stator is in the form of an annular-band-like projection on an annular-shaped end face of the stator.

* * * * *